United States Patent
Kantola

(10) Patent No.: US 6,332,526 B1
(45) Date of Patent: Dec. 25, 2001

(54) LOADING STATION

(75) Inventor: Juhana Kantola, Tampere (FI)

(73) Assignee: Fastems Oy AB, Tampere (FI)

( * ) Notice: Subject to any disclaimer, the term of this patent is extended or adjusted under 35 U.S.C. 154(b) by 0 days.

(21) Appl. No.: 09/497,766

(22) Filed: Feb. 4, 2000

(30) Foreign Application Priority Data

Feb. 17, 1999 (FI) .................................................. 990328

(51) Int. Cl.$^7$ .................................................. B65G 37/00
(52) U.S. Cl. .................................................. 198/346.1
(58) Field of Search .................... 198/339.1, 346.1, 198/346.2, 346.3

(56) References Cited

U.S. PATENT DOCUMENTS

| | | | |
|---|---|---|---|
| 4,754,863 | * | 7/1988 | Tsuchiya et al. .................. 198/339.1 |
| 4,790,061 | * | 12/1988 | Walker .................................... 29/563 |
| 5,193,967 | * | 3/1993 | Sartorio .................................. 414/225 |
| 5,330,301 | * | 7/1994 | Brancher ................................ 414/417 |
| 5,368,150 | * | 11/1994 | Okada et al. ...................... 198/346.1 |
| 5,577,597 | * | 11/1996 | Kakida et al. ..................... 198/465.1 |
| 5,715,585 | * | 2/1998 | Zachau et al. .......................... 29/33 P |
| 5,935,285 | * | 8/1999 | Lucas ........................................ 65/29 |
| 5,997,241 | * | 12/1999 | Malcolm ................................. 414/806 |
| 6,193,048 | * | 11/1998 | Keith ................................... 198/346.1 |
| 6,213,279 | * | 7/1999 | Killingbeck et al. ............. 198/346.1 |

* cited by examiner

Primary Examiner—Christopher P. Ellis
Assistant Examiner—Rashmi Sharma
(74) Attorney, Agent, or Firm—Louis Woo

(57) ABSTRACT

The invention relates to a loading station for receiving and delivering workpieces (WP), which loading station (L) comprises a table (3) arranged to be movable between a first position (S1) and a second position (S2) to support changing workpieces (WP) and for transferring them between said positions (S1, S2), and at least a first protective door (1) which is arranged to be transferred between said positions (S1, S2) to separate them from each other when the table (3) is in its second position (S2). In the invention, said first door (1) is arranged to be rotatable around a substantially horizontal axis (X1) in such a way that when the table (3) is in its first position (S1), the first door (1) is placed in a substantially horizontal position underneath the table (3), and the loading station (L) also comprises a second protective door (2) which is arranged to be transferred between said positions (S1, S2) to separate them from each other when the table (3) is in its first position (S1), wherein said second door (2) is arranged to be rotatable around a substantially horizontal axis (X2) in such a way that when the table (3) is in its second position (S2), the second door (2) is placed in a substantially horizontal position underneath the table (3).

12 Claims, 4 Drawing Sheets

LOADING STATION

Figure 1:
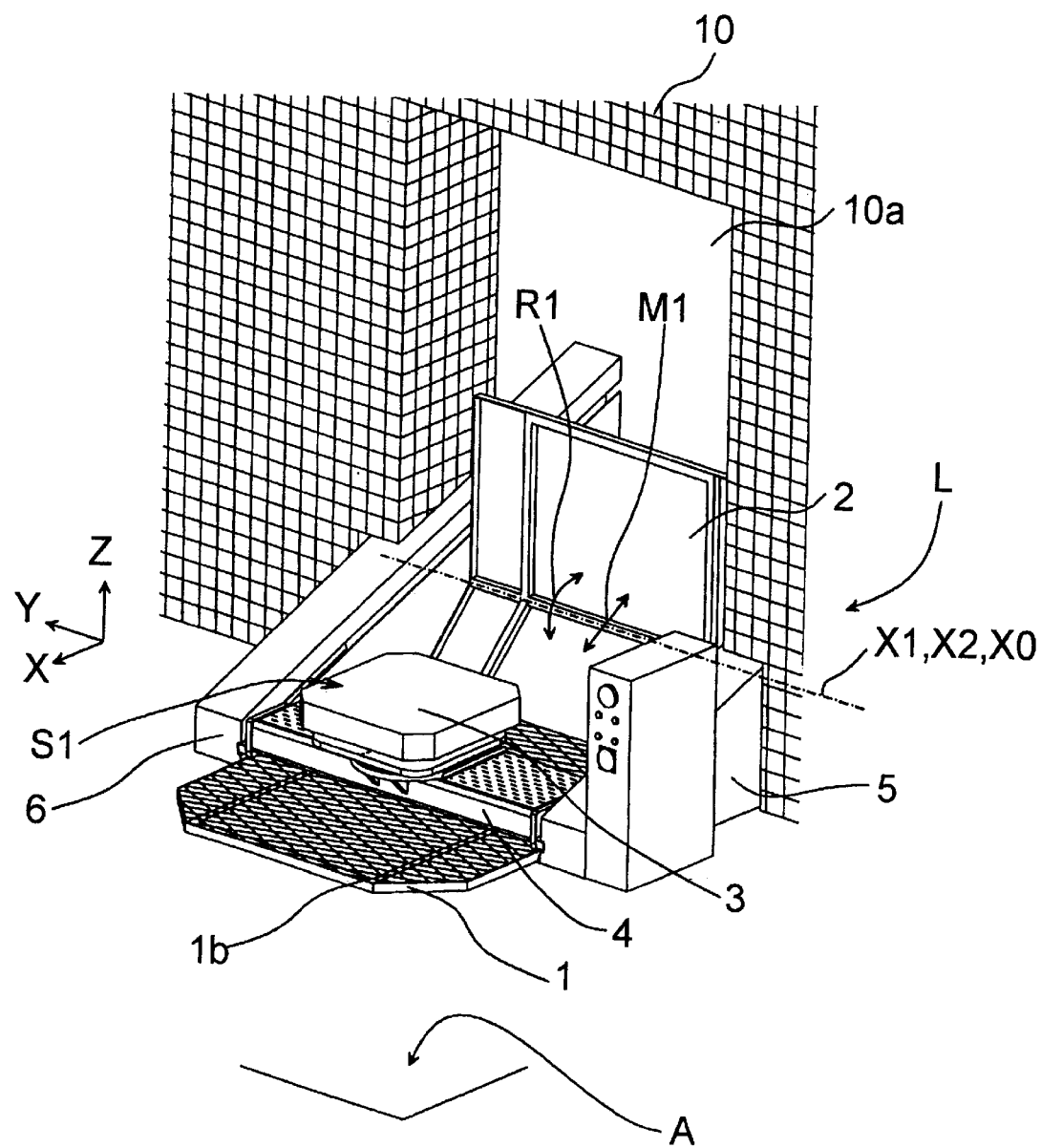

The present invention relates to a loading station according to the preamble of the appended claim 1. The invention also relates to an automatic piece processing system according to the preamble of the appended claim 9.

As is well known, e.g. in automatic flexible manufacturing systems (FMS) and flexible machining cells (FMC), different loading stations are used, by means of which e.g. work pieces located on a pallet are safely supplied into the system for processing, storage or other handling. The system typically comprises various automatically operating lifting and transfer devices which, effected by the control program of a control system, transfer the work piece. For the sake of industrial safety, the system is typically protected in such a way that persons, especially those operating the system, are prevented from entering the system, or at least their access is limited, during the operation of the system. Lifting and transfer devices are also used for delivering work pieces from the system via loading stations, wherein the user can transfer the work piece from the loading station e.g. by means of a crane, a forklift or another corresponding transfer device. The work piece can also be delivered from the system to the loading station for checking by the user or for other procedures, which can also take place when the system is operating.

Systems are known, in which the loading station comprises a movable table for transferring work pieces between two locations, i.e. positions. In the first position, a workpiece placed on a table is transferred to another position, in which the system, by means of lifting and transfer devices, receives the piece. The systems also deliver workpieces by means of the table. As is well known, the loading station can be provided with at least one protective door for the purpose of preventing the user from entering the work area of the lifting and transfer devices in order to avoid accidents, such as collisions, when the workpiece is in the first or second position. For industrial safety, the opening and closing of the doors is typically arranged in such a way that at least one door is always closed to separate the user of the loading station and the system in operation.

As is well known, the above-mentioned doors can be equipped with various sensor mechanisms and lock devices, known as such, which are coupled to a control system for detecting the position of the doors. The control of the doors in different situations for feeding and discharging workpieces can be arranged by means of data entered into the control system.

In case there are several doors in the loading station, their placement and operating mechanisms are often problematic and particularly take a lot of space when the doors are in the opened, non-protective position. Furthermore, the size of the loading station is increased by systems intended for collecting fluids, such as cutting fluids, and various pieces, such as chips.

It is an aim of the present invention to present a completely novel and compact loading station operating in a simple manner. The invention is based on the idea that the doors of the loading station rotate around a substantially horizontal rotation axis, and when the doors are alternatingly in their non-protective position, they are placed underneath said positions, wherein the doors can also be used as protective and collecting trays.

The loading station according to the invention is characterized in what will be presented in the characterizing part of the appended claim 1. The piece processing system according to the invention is characterized in what will be presented in the characterizing part of the appended claim 9.

An advantage of the invention is particularly the versatility of the doors, wherein when the door is placed underneath the position, the door can be arranged to function as said tray. When the door is closed, i.e. when it is lifted to the upright position, the tray is simultaneously emptied automatically. In this way, the construction of separate protective trays is avoided, and e.g. the handling of cutting fluids becomes easier.

Another advantage of an advantageous embodiment of the invention is also the particularly simple use, when two doors fixed to each other in an angular position can be opened and closed by means of one common actuator. Thus, also the control and sensor mechanism of the doors becomes simple, to secure as good industrial safety as possible in a variety of situations. It is a particular advantage of said embodiment of the invention that opening one door may always cause closing of the other door. By means of the sensor mechanism, it is possible simultaneously to prevent for example the entry of lifting and transfer devices into the path of the doors. Moreover, the operation of the doors is clear in view of industrial safety, and the transfer of the table without moving the doors is prevented.

Another advantage is that by means of an oblique movement, the height of the table in different positions can be easily adjusted to a height suitable for both the working of the user and the equipment of the system, wherein the table does not need to be equipped with separate lifting devices. The transfer of the table can be easily arranged by means of known machine parts without any special structures, which further reduces the costs. The horizontal doors, transfer devices and other structure are also primarily placed close to the floor, wherein they do not obstruct visibility. Another considerable advantage of the invention is space saving, because no separate space for the door or the door mechanisms needs to be arranged on the sides of or above the loading station. By means of a common rotation axis for the doors, placed as low down as possible, the structures can be simplified even further.

As the doors constitute an integrated structure, a particularly advantageous structure is formed, wherein the same rotating device can be used to turn the door structure into different positions, simultaneously taking care of the removal of cutting fluids and chips. As the door structure constitutes an integrated angular structure, cutting fluids and chips are efficiently collected, and the structure can be easily equipped with grooves, channels and outlets for guiding the fluids for collection.

By means of a particularly advantageous embodiment of the invention, a particularly advantageous and simple solution is accomplished, when the table and the integrated door structure are coupled to each other, for example with a chain or a wire rope. Thus, when the table is moved, also the door structure moves, wherein only a motor for moving the table and a transmission mechanism are needed. By arranging the coupling in a suitable way, the movements of the door structure and the table are synchronized with each other when the table is transferred between the positions.

Figure 2:
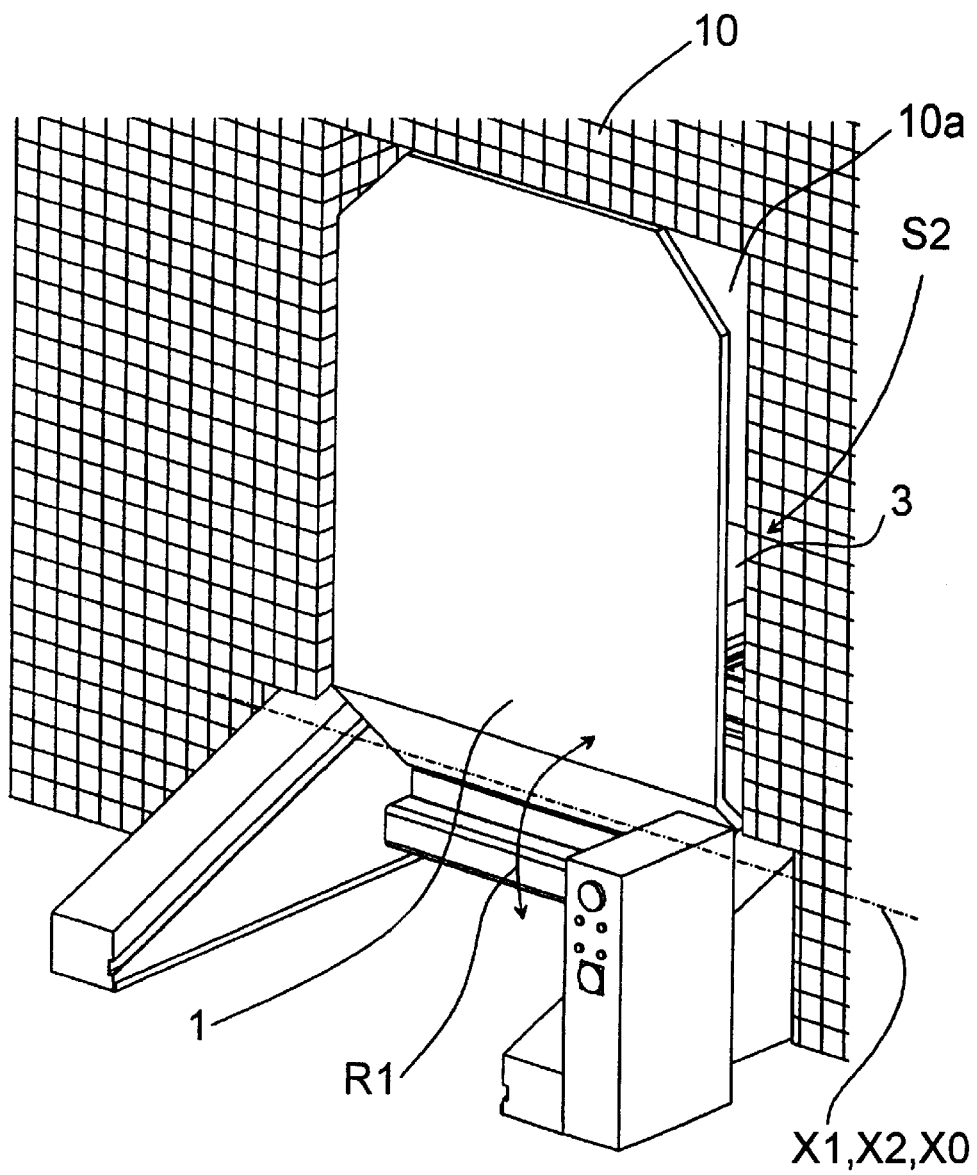
Figure 2:
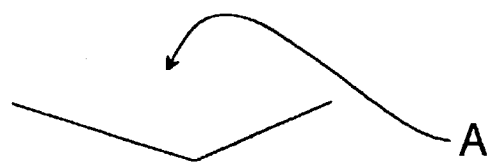
Figure 3A:
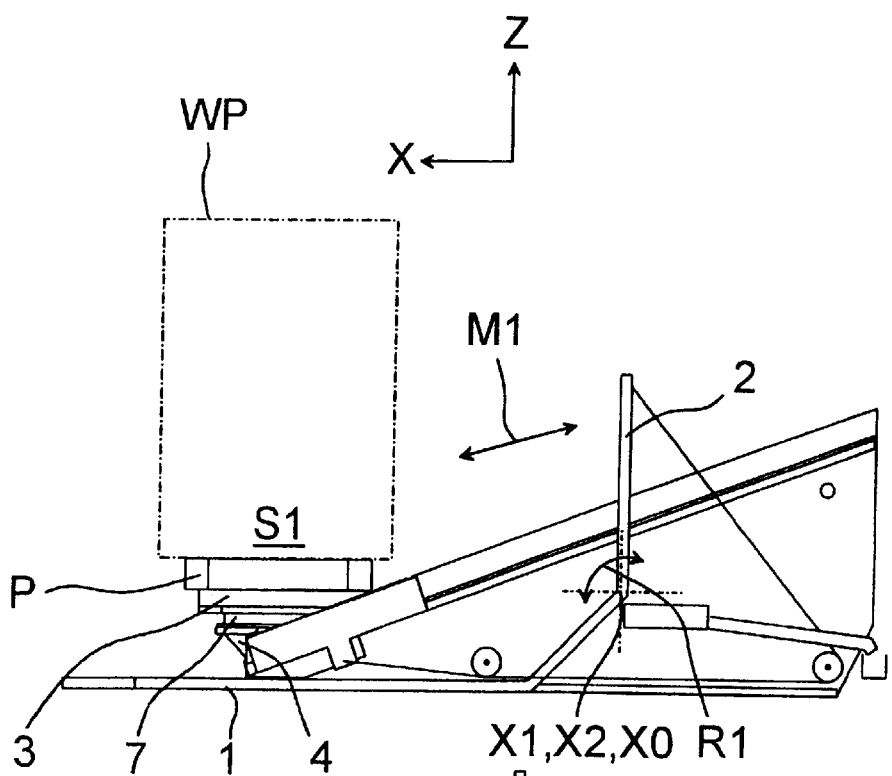
Figure 3B:
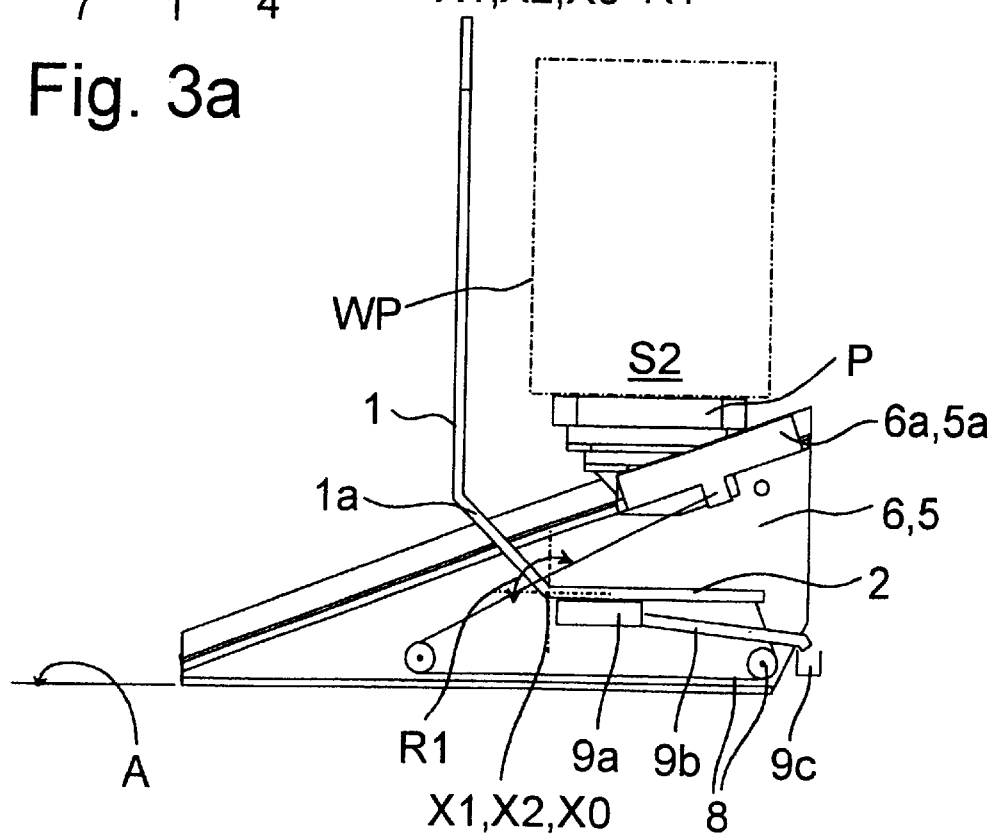
Figure 4:
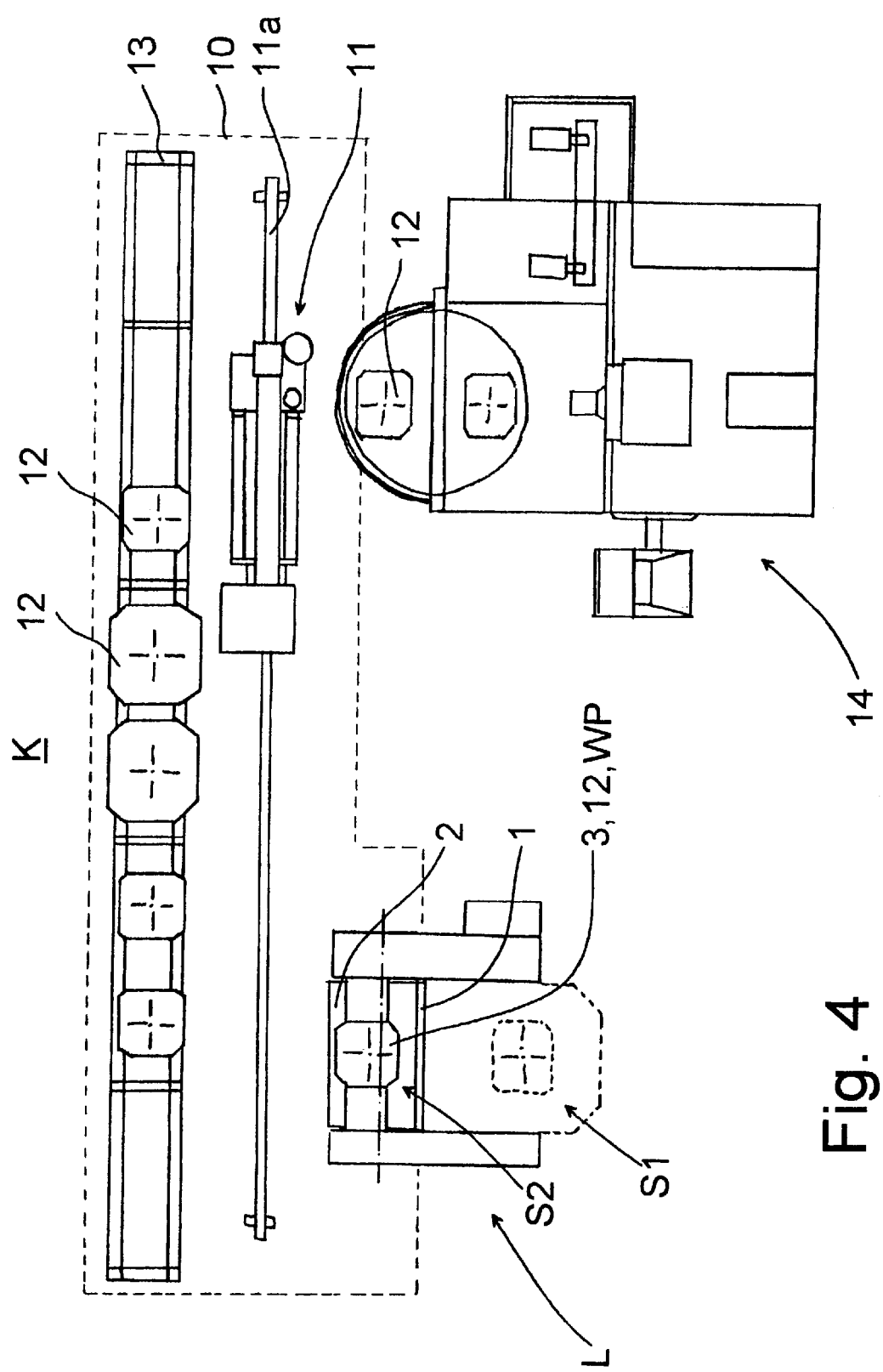

In the following, the invention will be described in more detail with reference to the appended drawings, in which:

FIG. 1 shows, in a perspective view, a loading station according to an advantageous embodiment of the invention when the table is in its first position and when the second door is in its protective upright position, FIG. 2 shows, in a perspective view, the loading station according to FIG. 1 when the table is in its second position and the first door is in its protective upright position, FIG. 3a shows, in a cross-sectional view and seen from the side, the loading station according to FIG. 1 when the table is in its first position, FIG. 3b shows, in a cross-sectional view and seen from the side, the loading station according to FIG. 1 when the table is in its second position, and FIG. 4 shows, seen from above, a piece processing system, in connection with which the loading station of FIG. 1 can be applied.

FIG. 1 shows a loading station L according to an advantageous embodiment of the invention. In connection with this description, a loading station also refers to handling stations, piece exchange stations and machining stations operating in a corresponding manner in connection with various manufacturing systems. The loading station may operate in connection with a storage system only, and furthermore, the loading station can operate for example in connection with a single automatic manufacturing device equipped with a manipulator, to change a piece to be worked or processed. In this context, the above mentioned systems are referred to as a piece processing system.

The table of the loading station can be equipped with various stands, rotary tables, support structures and the like, known as such, to handle a workpiece or a pallet. The workpieces to be handled in the loading station vary to a great extent, and in this description, workpieces also refer to various finished or semi-finished products to be transported, tool magazines, as well as pallets and supports to be handled as such.

With reference to FIG. 1, the loading station L is, for clarity, arranged in a piece processing system, in connection with which the loading station L can be applied. Of the system, only a protective enclosure 10 is illustrated, which prevents the entry into the working area used by the transfer and lifting devices upon moving, and in whose opening 10a the loading station L is fitted. In the position of FIG. 1, the second door 2 of the loading station L is in its protective, closing position and substantially vertical (arrow Z). The second door 2 and the first door 1 are fixed to each other in a substantially perpendicular direction, wherein the first door 1 is in its non-protective, opened position and substantially vertical (direction X and Y). The uniform, planar walls or doors 1 and 2 are arranged to be rotatable (arrow R1) around horizontal (direction X) axes X1 (door 1) and X2 (door 2), and in the presented embodiment, the axes X1 and X2 constitute a common rotation axis X0. Furthermore, the planar surfaces of the doors 1 and 2 are arranged parallel with said rotation axis X0. When the doors 1 and 2 are closed, they close an opening 10a at least partly, and in its opened position, the door 1 is placed outside the system and the door 2 is placed inside the system.

In the position according to FIG. 2, the first door 1 of the loading station L is in its protective, closed position and substantially vertical (arrow Z). The second door 2 and the first door 1 are fixed to each other, wherein the second door 2 is in its non-protective, opened position and substantially horizontal (direction X and Y). The table 3 of the loading station L is arranged to be movable between the first position S1 of FIG. 1 and the second position S2 of FIG. 2. To open the first door 1 by turning it into the protective position, the table 3 must be simultaneously transferred from the position S1 to the position S2 to make way for the door 1, and also the door 2 must be simultaneously turned down by turning it to the non-protective position to make way for the table 3. The direct movement (arrow M1) of the table 3 is arranged to be substantially perpendicular to the rotation axis X0 and in an oblique position with respect to the ground A, such as the floor.

FIG. 3a shows in detail the structure of the loading station L in a side view, wherein the figure also illustrates a workpiece WP placed by means of a pallet P on top of the table 3 and in the position S1. FIG. 3b illustrates the workpiece WP and the position of the doors 1, 2 when the table 3 and the workpiece WP are in the position S2. With reference to FIGS. 3a and 3b, to transfer (arrow M1) the table 3 between the positions S1 and S2, the loading station L according to an advantageous embodiment of the invention comprises a horizontal support arm 4 to support and move the table 3. On the support arm 4, underneath the table 3, it is also possible to arrange rotating means 7 for rotating the workpiece WP and the table 3 around a substantially vertical (arrow Z) direction. The ends of the arm 4 are fitted to extend to transfer means 5a and 6a arranged in support structures 5 and 6 which are formed by means of rails, motors, a shaft connecting the support structures, and chain gearings. The transmission can also be implemented with a wire rope, a belt and a guide screw. The structure is known as such for anyone skilled in the art, wherein a more detailed description is rendered unnecessary.

In the embodiment of FIGS. 3a and 3b, the doors 1, 2 and the transfer means 5a and 6a are coupled to each other by means of an idler wheel and chain transmission 8. The transmission 8 can also be implemented by means of a wire rope or a belt. The transmission 8 is synchronized and arranged in such a way that by moving the table 3 with the transfer means 5a, 5b from the position S1 to the position S2, the door 1 is pulled up, wherein the door 2 simultaneously comes down. By moving the table 3 with the transfer means 5a, 6a from the position S2 to the position S1, the door 1 comes down by gravity, because the door 1 is heavier than the door 2, and because the axis X0 is placed on the left side, in FIG. 3b, of the mass centre of the door 1, wherein the door 2 is simultaneously erected. In a corresponding transmission system, it is possible to arrange the moving of the door 1 and/or the door 2 also separately.

The guide and the transmission 5a, 6a are fitted on the bearing of the support frame 5, 6 in an oblique position with respect to the ground A, wherein the position S1 is located lower than the position S2. The transfer means fitted in the different support frames 5, 6 are substantially parallel, as well as the support frames, and they are substantially perpendicular to the axis X0. In their non-protective positions, the doors 1 and 2 are primarily placed between the support frames 5 and 6. The axes X1, X2 and X0 are arranged to run underneath the transfer means 5a, 6a, and furthermore, said axes are placed in the vertical direction (arrow Z) and in the horizontal direction (arrow X) between the positions S1 and S2 of the table 3. Also the doors 1, 2 are placed in their closing position between the positions S1 and S2 in the horizontal direction (arrow X). In its non-closing position, the door 1 is placed underneath the axis X0, and the door 2 is placed substantially in the same plane with the axis X0.

Further with reference to FIGS. 3a and 3b, the table 3 being in its first position S1, the first door 1 is placed underneath the table 3 substantially in the horizontal direction (arrow X, Y). When the table 3 is in its second position S2, the second door 2 is placed underneath the table 3 substantially horizontally (arrow X, Y). Thus, the door 1 and/or 2 can also act as trays for receiving cutting fluids and chips, wherein they are equipped with the necessary means e.g. for conveying the cutting fluids and feeding them forwards, when the lifting of the door 1 or 2 to the upright position by rotating is started.

To form a uniform, closed door structure 1, 2, the door 1 is connected with the door 2 by means of a bent part 1a, as shown in FIG. 3b. According to FIG. 1, for collecting cutting fluids and chips, the doors are equipped with channels 1b, by means of which the fluids and chips are introduced into a collecting system which comprises, according to FIG. 3b, a collecting receiver 9a for collecting chips and a pipework 9b for introducing fluids into a channel system 9c, from which the fluids are introduced e.g. into a collecting system of a factory. The collecting receiver 9a is made to be removable, wherein it can be pulled out from underneath the door 2 and emptied separately. The doors 1, 2 can be equipped with openings, from which the fluids and chips are discharged into the receiver 9a.

FIG. 4 further illustrates a piece processing system K, in connection with which the loading station L of the invention can be applied. The system K is typically at least partly separated with a protective enclosure 10 to prevent the entry into the working area used by the transfer and lifting devices 11 upon moving. The working area is limited by said enclosure 10. The working area is also expanded, to process a pallet and/or working piece 12 (also WP), to take it out from the loading station L and to place in on a storage shelf 13, by equipment fitted in the lifting and transfer device 11, such as shift forks, telescopic forks, lifting mechanisms, and the like. The lifting and transfer device 11 is normally arranged to be movable on a ground A, such as the floor level, and on the support of rails 11a. Through the loading station L, it is possible to feed workpieces 12 into the system K, for one or more manufacturing stations 14 and for storage. The operations by the manufacturing stations 14 on the workpieces 12 vary, and they may comprise automatic processing devices for manipulating a pallet. The system K is controlled in a way known as such by means of a control program stored in a control system, wherein the necessary data e.g. on the workpieces are entered into the control program.

The present invention is not limited solely to some advantageous embodiments presented above and used as examples, but it can be modified within the scope of the appended claims. It is obvious that the loading station can also comprise two tables moving in parallel, to move two separate workpieces. Furthermore, it is obvious that the means for moving the table can vary even to a great extent in their details. Similarly, the means for turning the doors may vary to a great extent, and they are known as such for anyone skilled in the art.

What is claimed is:

1. A loading station for receiving and delivering workpieces (WP), the loading station (L) comprising:
   a table (3) arranged to be movable between a first position (S1) and a second position (S2) to support changing workpieces (WP) and for transferring them between said positions (S1, S2), and
   at least a first protective door (1) which is arranged to be transferred between said positions (S1, S2) to separate them from each other when the table (3) is in its second position (S2),
   characterized in that:
   said first door (1) is arranged to be rotatable around a substantially horizontal axis (X1) in such a way that when the table (3) is in its first position (S1), the first door (1) is placed in a substantially horizontal position underneath the table (3), and
   the loading station (L) also comprises a second protective door (2) which is arranged to be transferred between said positions (S1, S2) to separate them from each other when the table (3) is in its first position (S1), wherein said second door (2) is arranged to be rotatable around a substantially horizontal axis (X2) in such a way that when the table (3) is in its second position (S2), the second door (2) is placed in a substantially horizontal position underneath the table (3).

2. The loading station according to claim 1, characterized in that the first door (1) and the second door (2) are fixed to each other in an angular position with respect to each other and are arranged to be rotatable around a common, substantially horizontal axis (X0).

3. The loading station according to claim 1, characterized in that the table (3) is arranged to be movable between the positions (S1, S2) by a substantially direct movement, which is substantially perpendicular to said axes (X1, X2, X0).

4. The loading station according to claim 1, characterized in that the first position (S1) of the table (3) is placed lower than the second position (S2) of the table (3) in the vertical direction.

5. The loading station according to claim 1, characterized in that said axes (X1, X2, X0) are located at least lower than the second position (S2).

6. The loading station according to claim 1, characterized in that for moving the table (3), the loading station (L) comprises a support arm (4) for supporting the table (3), which support arm (4) extends in the first position (S1) and in the second position (S2) to a support frame (5, 6) arranged on both sides of said doors (1, 2), the support frame being equipped with transfer means (5a, 6a) for transferring the table (3) between the positions (S1, S2).

7. The loading station according to claim 1, characterized in that the first door (1) and the second door (2) are coupled to each other in such a way that when the first door (1) moves, also the second door (2) moves.

8. The loading station according to claim 1, characterized in that for moving the table (3), the loading station (L) comprises transfer means (5a, 6a) which, for synchronizing the movement of the table (3) and the door (1, 2), are coupled by means of a transmission (8) also to the first door (1) and/or the second door (2).

9. The loading station according to claim 1, characterized in that the first door (1) and/or the second door (2) is equipped with means (1b) for receiving and guiding fluids and/or chips, and that the loading station (L) is equipped with a collecting system (9a, 9b, 9c) for collecting fluids and/or chips.

10. An automatic piece processing system which comprises at least lifting and transfer means (11) for processing workpieces (12), and a loading station (L) for receiving and delivering workpieces, the loading station (L) comprising:
    a table (3) arranged to be movable between a first position (S1) and a second position (S2) to support changing workpieces (WP) and for transferring them between said positions (S1, S2), wherein said first position (S1) is arranged for entering workpieces (WP, 12) into a system (K) and for receiving workpieces (WP, 12) delivered by the system (K), and wherein said second position (S2) is arranged for receiving and delivering workpieces (WP, 12) by means of said lifting and transfer means (11), and
    at least a first protective door (1) which is arranged to be transferred between said positions (S1, S2) to separate them from each other when the table (3) is in its second position (S2),
    characterized in that:
    said first door (1) is arranged to be rotatable around a substantially horizontal axis (X1) in such a way that when the table (3) is in its first position (S1), the first door (1) is placed in a substantially horizontal position underneath the table (3), and
    the loading station (L) also comprises a second protective door (2) which is arranged to be transferred between said positions (S1, S2) to separate them from each other when the table (3) is in its first position (S1), wherein said second door (2) is arranged to be rotatable around a substantially horizontal axis (X2) in such a way that when the table (3) is in its second position (S2), the second door (2) is placed in a substantially horizontal position underneath the table (3).

11. The system according to claim 10, characterized in that the first door (1) and the second door (2) are fixed to each other in an angular position with respect to each other and arranged to be rotatable around a common, substantially horizontal axis (X0).

12. The system according to claim 10, characterized in that said table (3) is arranged to be movable between the positions (S1, S2) by means of a substantially direct movement, which is substantially perpendicular to said axes (X1, X2, X0), and that the first position (S1) of the table is located lower than the second position (S2) of the table (3) in the vertical direction.

* * * * *